United States Patent [19]

Roe et al.

[11] 3,751,748

[45] Aug. 14, 1973

[54] HAND HELD ROLLER FRAME

[75] Inventors: Elverton O. Roe; Charles Gregg Moore, both of Wooster, Ohio

[73] Assignee: The Wooster Beush Company, Wooster, Ohio

[22] Filed: Dec. 15, 1971

[21] Appl. No.: 208,132

[52] U.S. Cl............... 15/230.11, 15/144 B, 29/117, 242/68.2, 242/72.1, 287/58 CT
[51] Int. Cl. ........ B05c 1/08, B44d 3/28, F16b 7/14
[58] Field of Search ................ 15/27, 143 B, 144 B, 15/230.11, 248 A; 29/110.5, 117; 242/72.1; 279/2

[56] References Cited
UNITED STATES PATENTS

| | | | |
|---|---|---|---|
| 3,060,555 | 10/1962 | Kirshenbaum et al. ....... | 15/230.11 X |
| 3,638,271 | 2/1972 | Pharris et al..................... | 15/230.11 |
| 3,335,446 | 8/1967 | McGinley ........................ | 15/230.11 |
| 2,394,503 | 2/1946 | Wilson.............................. | 242/72.1 |
| 3,685,084 | 8/1972 | Bennett............................ | 15/230.11 |
| 3,596,946 | 8/1971 | Burton et al. ............... | 15/144 B UX |
| 3,520,628 | 7/1970 | Moceri........................... | 15/230.11 X |
| 3,380,097 | 4/1968 | Pharris........................... | 15/230.11 X |
| 3,119,137 | 1/1964 | Schveler ......................... | 15/230.11 |

FOREIGN PATENTS OR APPLICATIONS

| | | | |
|---|---|---|---|
| 1,083,930 | 6/1954 | France............................. | 15/230.11 |
| 208,870 | 11/1966 | Sweden............................ | 15/144 B |
| 470,745 | 12/1927 | Germany......................... | 15/144 B |
| 735,255 | 8/1955 | Great Britain ................... | 15/144 B |

*Primary Examiner*—Daniel Blum
*Attorney*—Donald L. Otto

[57] ABSTRACT

Roller frame includes an expandable core on the roller frame shaft having plural expandable fingers which are forced radially outwardly into frictional engagement with the inner diameter of a roller cover telescoped over the expandable fingers during axial movement of the expandable core in one direction relative to an axially stationary cam hub on the shaft. Removal of the roller cover merely requires the application of thumb pressure to the inboard end of the expandable core which forces the expandable core in the opposite direction releasing the expandable fingers from the locking tension of the cam hub and thereby permitting radial inward movement of the expandable fingers to release the roller cover from the frame. A telescoping handle extension may be attached to the frame handle permitting extension of both the handle and handle extension to any desired length and releasably locked in place for reaching different heights.

6 Claims, 10 Drawing Figures

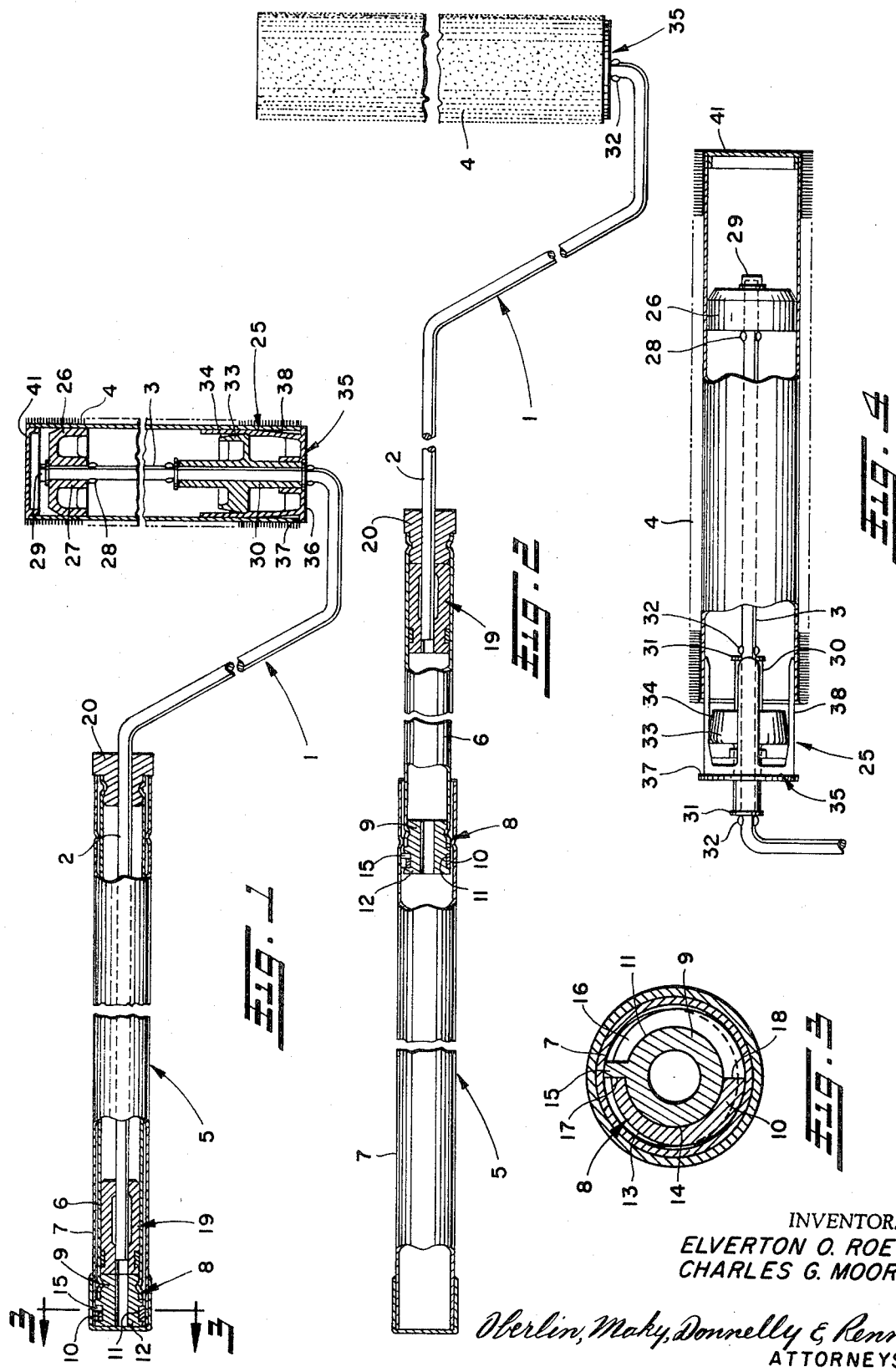

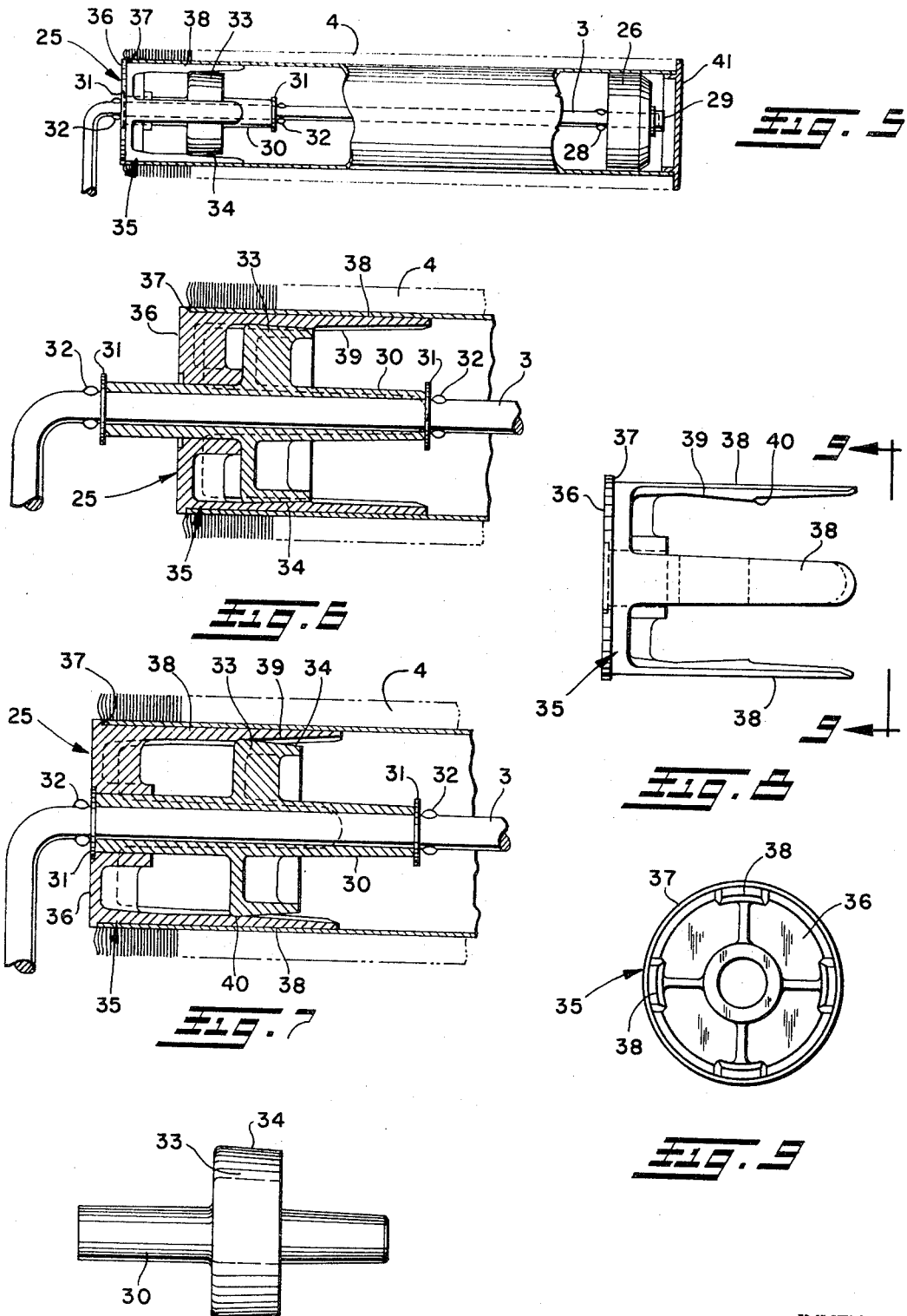

HAND HELD ROLLER FRAME

BACKGROUND OF THE INVENTION

This invention relates generally as indicated to a roller frame, and more particularly, to a roller frame having provision for frictionally retaining a roller cover in place and permitting ready replacement thereof.

There are several known types of paint roller frames which provide for replacement of the paint roller cover after use so that the frame may be reused at a substantial savings. The most common way of retaining the paint roller cover on the frame is by a wing nut or the like threaded onto the outboard end of the roller frame shaft. However, to replace the roller cover requires the operator to unscrew the nut and physically pull the cover off the shaft, which is particularly unsatisfactory when the roller cover and other parts of the roller frame are coated with paint. Reinserting the roller frame shaft through the holes in the end caps of a new roller cover is also sometimes difficult and time consuming, and the threaded end of the roller frame shaft usually projects beyond the outboard end of the paint roller cover after assembly by an amount sufficient to interfere with painting closely adjacent to corners and the like.

Flexible cage frames are also used for frictionally retaining paint roller covers in place, but they are relatively expensive and also require handling of the cover to remove it.

SUMMARY OF THE INVENTION

With the foregoing in mind, it is a principal object of this invention to provide a roller frame which positively retains the roller cover thereon during use and yet permits ready removal of the roller cover without having to touch it which is particularly advantageous when the roller cover is filled with paint or other material.

Another object is to provide such a roller frame which permits quick and easy assembly of a roller cover onto the frame.

Still another object is to provide such a roller frame in which both the handle extension and frame are extensible to provide a three-piece telescoping section permitting adjustment of the length for reaching different heights.

These and other objects of the present invention may be achieved by providing the roller frame with an expandable core at the inboard end of the roller frame shaft. The expandable core has plural expandable fingers thereon which are forced radially outwardly into frictional engagement with the inner diameter of a surrounding roller cover by an axially stationary cam hub on the shaft during axial movement of the expandable core toward the inboard end.

Removal of the roller cover merely requires the application of sufficient thumb pressure to the inboard end of the expandable core to force the expandable core axially outwardly which releases the expandable fingers from the locking tension of the cam hub and permits radial inward movement of the expandable fingers to release the roller cover from the frame. The forward motion of the expandable core transmits momentum to the roller cover causing it to slip freely from the core when its forward movement is stopped by engagement with the axially stationary cam hub. This is an advantage over prior known frictional retaining devices in that the roller cover may be removed without having to handle it.

An extensible handle extension may be attached to the frame for reaching different heights, and the frame may also be extensible relative to the handle extension to provide a three-piece telescoping section for greater adjustment of the length thereof.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 1 is a fragmentary longitudinal section through a preferred form of roller frame and extensible handle extension constructed in accordance with this invention, such handle extension being shown fully retracted;

FIG. 2 is a fragmentary longitudinal section similar to FIG. 1 but showing the handle extension and frame fully extended;

FIG. 3 is an enlarged transverse section through the handle extension of FIG. 1, taken on the plane of the line 3—3 thereof;

FIGS. 4 and 5 are enlarged side elevation views of the roller frame shaft and roller cover supporting and retaining members of FIGS. 1 and 2, showing sequentially the procedure for assembling a roller cover, partially broken away, onto the roller frame;

FIGS. 6 and 7 are further enlarged longitudinal sections through the roller cover supporting and retaining members in the positions shown in FIGS. 4 and 5, respectively, at the inboard end of the roller frame shaft;

FIG. 8 is a side elevation view of the expandable core only for the roller cover supporting and retaining member of FIGS. 6 and 7;

FIG. 9 is an end elevation view of the expandable core of FIG. 8 as seen from the plane of the line 9—9 at the right end of FIG. 8; and FIG. 10 is a side elevation view of the cam hub only for the roller cover supporting and retaining member of FIGS. 6 and 7.

DESCRIPTION OF THE PREFERRED EMBODIMENT

Referring now in detail to the drawings, and initially to FIGS. 1 and 2 thereof, there is shown by way of example a preferred form of roller frame 1 constructed in accordance with this invention. The roller frame 1 is desirably made from heavy gauge wire or rod bent to shape to provide a handle portion 2 at one end and a shaft portion 3 at the other end for rotatably supporting a roller cover 4 thereon in a manner to be more fully described hereafter.

Attached to the handle portion 2 of the frame 1 is a handle extension 5 which may be of any conventional design but desirably consists of a pair of telescoping members 6 and 7 which may be fully retracted as shown in FIG. 1 or fully extended as shown in FIG. 2 or anywhere in between to permit the operator to reach different heights.

When the extensible handle extension 5 is adjusted to the desired longitudinal adjusted position, the telescoping members 6 and 7 may be releasably locked in such adjusted position as by means of a cam lock 8 which may be of the type shown in U.S. Pat. No. 3,596,946, granted Aug. 3, 1971, including a generally cylindrically shaped plug 9 and a collar or ring 10. The plug 9 is inserted in the end of the inner telescoping member 6 and locked in place as by indenting the inner telescoping member around the outer periphery of the plug, and the collar or ring 10 is received in an eccentric groove 11 in the outer periphery on the outer projecting portion 12 of the plug. The collar 10 has an outer cylindrical surface 13 and an eccentric opening 14 providing the collar with a shape corresponding to the eccentric groove 11 in the plug 9.

Projecting into the eccentric groove 11 in the plug 9 is a projection or stop 15 which is received in a circumferentially extending slot 16 in the collar 10 for limiting the extent of rotation of the collar relative to the plug by engagement of the ends of the slot with the stop. The slot 16 desirably extends approximately 180° around the collar 10, and the projection 15 is positioned so that when the collar is rotated in a clockwise direction to bring one end 17 of the slot 16 into engagement with the projection as shown in FIG. 3, the collar is eccentrically disposed on the plug, forcing the collar and plug into frictional engagement with opposite sides of the outer telescoping member 7 for locking both telescoping members 6 and 7 in longitudinal adjusted position. When the collar 10 is rotated in the reverse or counterclockwise direction to bring the other end 18 of the slot 16 into engagement with the projection 15, the collar is concentrically located within the groove 11 on the plug 9 and will not interfere with longitudinal adjustment of the outer telescoping member 7 with respect to the inner telescoping member 6.

The collar 10 is made of a flexible material such as nylon and is split to facilitate assembly of the collar onto the plug and assure frictional sliding contact between the collar and inner diameter of the outer member 7 even when the collar is concentrically disposed within the groove 11. Such a cam lock 8 permits positive locking of the telescoping members 6 and 7 in adjusted position by relative rotation of such members in one direction and permits the members to be released by relative rotation of the members in the opposite direction for further longitudinal adjustment of the members thus providing to the user a known direction both for tightening and untightening of the lock. For a more detailed description of the construction and operation of the cam lock 8, reference may be had to the aforementioned U.S. Pat. No. 3,596,946 which is incorporated herein by way of reference.

The handle portion 2 of roller frame 1 is desirably of sufficient length to extend substantially the full length of the inner telescoping member 6, and such handle portion may have a cam lock 19 similar to the cam lock 8 suitably attached to the outermost end thereof thus to permit the handle portion 2 as well as the handle extension 5 to be releasably locked in longitudinal adjusted position within the inner member 6 anywhere between the fully retracted position shown in FIG. 1 and the fully extended position shown in FIG. 2. The roller frame handle portion 2 is supported within the nearest end of the inner tubular member 6 by a bushing 20 disposed therewithin, such bushing acting as a guide for the roller frame handle portion during longitudinal adjustment thereof and providing a stop for the cam lock 19 limiting outward extension of the handle portion 2 relative to the handle extension 5.

For supporting and retaining the roller cover 4 on the shaft portion 3 of the roller frame 1, there is provided a roller cover supporting and retaining member 25 on the inboard end of the shaft 3 and a roller cover supporting member 26 on the outboard end. The outboard roller cover support member 26 is in the form of an annular support roll made of plastic or other suitable material whose outside diameter is slightly less than the inside diameter of the roller cover 4. Centrally of the outboard support roll 26 is a central bearing sleeve portion 27 which supports the support roll on the shaft 3 for rotation (see FIG. 1), and the support roll is retained in place on the shaft as by providing stakes 28 on the shaft adjacent the inboard end of the support roll and a snap-on cap 29 on the outboard end of the shaft.

The roller cover supporting and retaining member 25 includes an elongated bearing sleeve or bushing 30 rotatable on the inboard end of the shaft 3 and retained against axial movement as by staking the shaft adjacent the ends of the sleeve, with washers 31 preferably being disposed between the stakes 32 and sleeve ends to facilitate rotation of the sleeve. Fixed to the bearing sleeve 30 in axially spaced relation from the inboard end thereof intermediate the ends of the bearing sleeve 30 is a cam hub 33 having an exterior cam taper 34 shaped as best seen in FIGS. 6, 7 and 10.

Axially slidably received on the inboard portion of the bearing sleeve 30 is an expandable core 35 which as best seen in FIGS. 6 through 9 includes an end cap 36 for covering the inboard end of the roller cover 4 when brought into engagement with an outer peripheral shoulder or step 37 on the expandable core. Projecting axially outwardly from the end cap 36 in circumferentially spaced relation toward the outboard end of the shaft are a plurality of expandable locking fingers 38.

When the expandable core 35 is moved closely adjacent the cam hub 33 as shown in FIGS. 4 and 6, the expandable locking fingers 38 are free to move radially inwardly to their normal retracted position permitting free sliding movement of the roller cover 4 over the locking fingers. During return movement of the expandable core from the FIG. 6 position to the FIG. 7 position the expandable locking fingers 38 are forced radially outwardly by the cam hub 33 into frictional engagement with the inner diameter of the roller cover. When the expandable core 35 is in its inboardmost position shown in FIGS. 1, 5 and 7, the expandable locking fingers 38 are maintained in frictional engagement with the inner diameter of the roller cover by the cam hub 33 which contacts the inner cam surfaces 39 on the locking fingers and engages offset or detent areas 40 on such cam surfaces 39 locking the expandable core in place.

Although the outer surfaces of the flexible locking fingers 38 are shown as being substantially semi-cylindrical when in the retracted position, it will be apparent that the locking fingers may be of other shapes, for example, they may be provided with an inwardly bowed middle portion for increased expansion by the cam hub when the expandable core is moved to the inboardmost position. Moreover, the outer surfaces of the flexible fingers may be provided with serrations and the like to enhance gripping.

To assemble the roller cover 4 onto the roller frame 1, thumb pressure should first be applied to the end cap 36 of the expandable core 35 to make certain that the expandable core is in its outboardmost position up against the inboard end of the cam hub 33 with the expandable locking fingers 38 in their radial innermost position where they will not interfere with sliding of the open end of the roller cover 4 onto the expandable core from the outboard end as shown in FIG. 4. When the inboard end of the roller cover 4 engages the outer shoulder or step 37 on the expandable core 35, a pushing force is applied to the outboard end of the roller cover to push the expandable core and roller cover axially to the inboardmost end position shown in FIGS. 5 and 7. During such axial movement of the expandable core 35 from the FIG. 6 position to the FIG. 7 position, the expandable locking fingers 38 are forced concentrically radially outwardly as the interior cam surfaces 39 on the locking fingers ride over the exterior tapered cam surface 34 on the cam hub 33 as aforesaid thereby frictionally locking the roller cover in place. By the time the expandable core 35 reaches the inboardmost position shown in FIG. 7 against the stop provided by the inboard stakes 32 and washer 31, the locking fingers 38 on the expandable core will have ridden up over the cam hub 33 and the cam hub will be engaging the offset or detent areas 40 on the inner cam surfaces to lock the expandable core in place. A separate end cap 41 may be provided on the outboard end of the roller cover 4 to protect the outboard support roll 26 which is located within the paint roller cover after assembly from being covered with paint.

Removal of the roller cover 4 from the roller frame 1 merely requires the application of thumb pressure to the inboard end of the expandable core 35 while holding the roller frame stationary to move the expandable core back from the FIG. 7 position to the FIG. 6 position which releases the locking fingers 38 from the locking tension of the cam hub 33 and permits radial inward movement of the expandable fingers to release the roller cover from the frame. The forward motion of the expandable core 35 from the FIG. 7 position to the FIG. 6 position provides momentum to the roller cover 4 causing it to freely slide off the expandable core when its forward movement is stopped by engagement with the cam hub.

From the foregoing, it will now be apparent that the roller frame of the subject invention provides a very simple and effective means for frictionally retaining a roller cover in place and greatly facilitates removal of the roller cover without the necessity of having to handle it. The roller frame may also be provided with a handle extension which also permits extension of the roller frame relative to the handle extension for reaching different heights.

The embodiments of the invention in which an exclusive property or privilege is claimed are defined as follows:

1. A roller frame comprising a handle portion and a shaft portion having an outboard end and an inboard end connected to said handle portion, and retaining means mounted on said shaft portion for frictionally retaining a roller cover thereon, said retaining means comprising a cam hub and expandable core mounted on said shaft portion for axial movement relative to each other, said expandable core comprising an end cap for one end of such roller cover, and a plurality of elongated circumferentially spaced axially extending radially expandable locking fingers supported at one of their ends by said end cap and unsupported at their other ends, said expandable locking fingers having interior tapered cam surfaces which taper inwardly from the supported ends of said expandable locking fingers toward the unsupported ends thereof and terminate a substantial distance from the ends of said expandable locking fingers, said cam hub having an exterior tapered cam surface corresponding to the interior tapered cam surfaces on said locking fingers, whereby said locking fingers are urged radially outwardly during relative axial movement of said cam hub and expandable core in one direction and are urged radially inwardly during relative axial movement of said cam hub and expandable core in the opposite direction, said expandable locking fingers having detent means adjacent the radial innermost ends of said interior tapered cam surfaces engageable by said cam hub for locking said expandable locking fingers in expanded condition.

2. The roller frame of claim 1 wherein said cam hub is fixed against axial movement on said shaft portion and said expandable core is axially movable relative to said cam hub, said cam hub being mounted on a bearing sleeve rotatably received on said shaft portion, said bearing sleeve having axially extending portions extending axially beyond both ends of said cam hub, said expandable core being axially slidably received on one of said axially extending portions.

3. The roller frame of claim 2 wherein said one axially extending portion of said bearing sleeve is at the inboard end of said shaft portion, and said expandable locking fingers are urged radially outwardly during axial movement of said expandable core toward said inboard end and urged radially inwardly during axial movement of said expandable core toward said outboard end.

4. The roller frame of claim 2 wherein spikes are provided on said shaft portion adjacent opposite ends of said bearing sleeve to retain said bearing sleeve against axial movement, and washers are disposed between said spikes and bearing sleeve ends to facilitate rotation of said bearing sleeve and cam hub carried thereby on said shaft portion, one of said washers acting as a stop limiting axial movement of said expandable core away from said cam hub.

5. The roller frame of claim 1 wherein said cam hub and expandable core are mounted on the inboard end of said shaft portion and an annular roller support is mounted on said outboard end, and said end cap has a peripheral shoulder engageable by one end of said roller cover.

6. The roller frame of claim 1 further comprising an extensible handle extension attached to the outer end of said handle portion, said handle extension including inner and outer telescoping members movable axially relative to each other to adjust the length of said handle extension, and means for locking said telescoping members in axially adjusted position, said handle portion being axially movable within said handle extension to adjust the length of said handle portion, and means for locking said handle portion in axially adjusted position within said handle extension.

* * * * *